United States Patent
Vincent

[19]
[11] Patent Number: 5,920,730
[45] Date of Patent: Jul. 6, 1999

[54] COMPUTER KEYBOARD THAT CHANGES FROM NORMAL MODE TO SECURE MODE BYPASSING HOST TO INPUT PIN CODE DIRECTLY INTO SMARTCARD RECEIVED AT ITS ICC INTERFACE

[75] Inventor: Francois Vincent, Corenc, France

[73] Assignee: Hewlett-Packard Company, Palo Alto, Calif.

[21] Appl. No.: 08/686,246

[22] Filed: Jul. 25, 1996

[30] Foreign Application Priority Data

Sep. 14, 1995 [EP] European Pat. Off. .............. 95410109

[51] Int. Cl.⁶ .................................................. G06F 13/00
[52] U.S. Cl. .................... 395/834; 395/188.01; 395/186; 395/835; 380/25; 341/22
[58] Field of Search .............................. 395/821, 188.01, 395/186; 380/52, 25; 341/22, 20

[56] References Cited

U.S. PATENT DOCUMENTS

| | | | |
|---|---|---|---|
| 5,375,165 | 12/1994 | Haber et al. ............................. | 379/90 |
| 5,406,624 | 4/1995 | Tulpan ....................................... | 380/4 |
| 5,517,569 | 5/1996 | Clark ......................................... | 380/52 |
| 5,610,601 | 3/1997 | Lahti et al. ................................ | 341/22 |
| 5,717,428 | 2/1998 | Barrus et al. ............................. | 345/168 |
| 5,742,756 | 4/1998 | Dillaway et al. ......................... | 395/186 |
| 5,748,888 | 5/1998 | Angelo et al. ............................ | 395/186 |

FOREIGN PATENT DOCUMENTS

| | | |
|---|---|---|
| 0486363 | 5/1992 | European Pat. Off. . |
| A0587375 | 3/1994 | European Pat. Off. .......... G06F 1/00 |

OTHER PUBLICATIONS

Elektronik, vol. 36, No. 21, Oct. 16, 1987, pp. 126–130, XP000030968 Guntner M et al: "Mehr Als Eine Tastatur" *the whole document*.

*Primary Examiner*—Thomas C. Lee
*Assistant Examiner*—Albert Wang

[57] ABSTRACT

A computer keyboard unit is provided with a card interface for receiving an integrated circuit card (smartcard). Normally the keyboard operates in standard manner with the keyboard controller outputting key codes to an associated host computer in correspondence to the keys pressed by a user. However, when the user is required to input a PIN code for passing to a smartcard inserted in the card interface, the keyboard controller is set into a special mode in which it passes the key codes of the pressed keys directly to the card interface for transmission to the smartcard. The passing of the PIN code directly to the smartcard and not via the host computer, eliminates the possibility of the PIN code being copied and/or substitued for in passage through the host computer.

27 Claims, 4 Drawing Sheets

COMPUTER KEYBOARD THAT CHANGES FROM NORMAL MODE TO SECURE MODE BYPASSING HOST TO INPUT PIN CODE DIRECTLY INTO SMARTCARD RECEIVED AT ITS ICC INTERFACE

FIELD OF THE INVENTION

The present invention relates to a computer keyboard unit provided with an integrated circuit card (ICC) interface for receiving an integrated circuit card (often called a "smartcard"); in particular, but not exclusively, the present invention concerns the input of PIN codes to a smartcard inserted in the ICC interface. A PIN code is a security code that may be required to enable certain smartcard functions or authorise transactions using the card (PIN standing for "Personal Identification Number" though in practice a PIN code may in some applications include non-numeric characters).

BACKGROUND OF THE INVENTION

It is known to provide computers with ICC interface units (often called smartcard readers though, in fact, data is frequently both read from, and passed to, the card). Such ICC interface units have traditionally been provided as separate peripherals, interfacing with the computer through a dedicated port (for example, an RS232 serial port).

Figure 1:
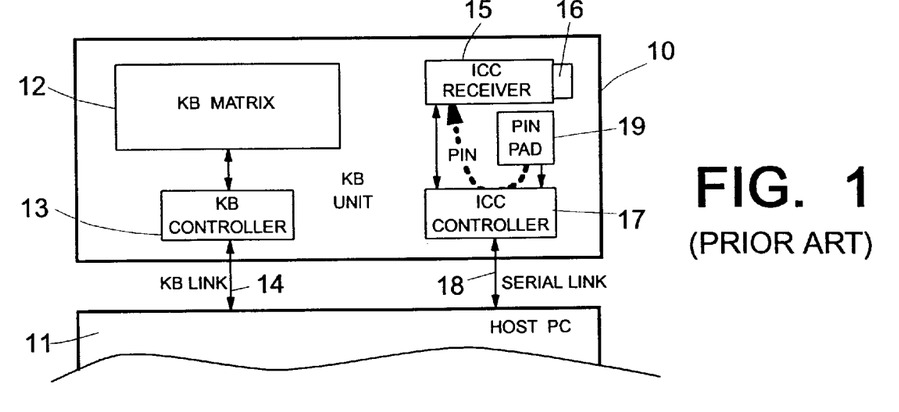
FIG. 1 is a diagram of a first known keyboard arrangement incorporating an ICC interface.

For simple user convenience, rather than providing the ICC interface unit as a separate peripheral, it is also known to incorporate an ICC interface into the keyboard unit of the computer. Generally, this combination of keyboard and ICC interface has simply been a packaging exercise with the functionality of the keyboard and ICC interface remaining separate. FIG. 1 of the accompanying drawings illustrates such an arrangement for a keyboard unit 10 connected to a host computer 11. This unit 10 is provided with the standard keyboard components of a key matrix 12 (taken to include the keyboard keys) and keyboard controller 13, the keyboard controller operating to detect key presses and to output corresponding key codes to the host computer 11 over a serial keyboard link 14. The keyboard unit also has an ICC interface comprising a card receiver 15 into which a smartcard 16 can be inserted to electrically connect the card circuits with the ICC interface, an ICC controller 17 for controlling both the exchange of data with the card 16 and communication with the host computer 11 over a serial link 18, and a PIN pad 19 for use in entering a PIN code to enable certain functions of the smartcard 16 or to authorise transactions using the card. Both the keyboard controller and the ICC controller are generally implemented using respective program-controlled processors (typically in the form of microcontrollers).

In use of the FIG. 1 keyboard unit, when a PIN code is required to be entered, this is done using the PIN pad 19, the code being passed to the card 16 by the ICC controller 17. With this arrangement, the PIN code is routed entirely within the ICC interface on its way to the smartcard and there is no need to encrypt the PIN code.

Figure 2:
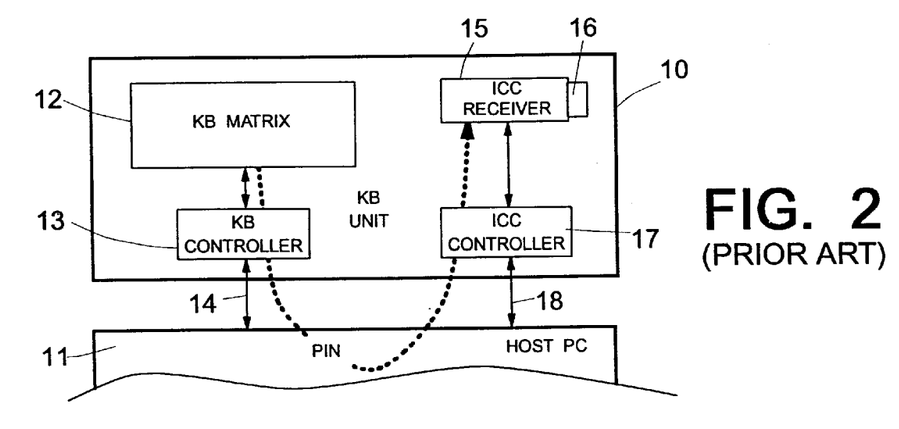
FIG. 2 is a diagram of a second known keyboard arrangement incorporating an ICC interface.

It will be appreciated that the FIG. 1 arrangement is not an optimised one since there is a duplication of certain elements between the keyboard part and the ICC interface part. In particular, the provision of the PIN pad 19 is generally an unnecesary duplication as this is normally a simple numeric keypad the equivalent of which is to be found on most current computer keyboards. FIG. 2 shows a known prior art arrangement in which the PIN pad 16 of FIG. 1 has been removed; instead, PIN entry is now done using the key matrix 12, the PIN being passed, like any other keyed input, to the host computer 11 where it is then rerouted back to the ICC controller 17 and onto the smartcard 16. Not only does this arrangement avoid the need for the PIN pad 19, but it also enables the host computer to effect any required code translation so that the character codes passed to the smartcard in respect of the PIN, are in a character/character code mapping understood by the card (this mapping may be different from that effectively implemented by the keyboard controller 13 when outputting key codes to the host).

However, the FIG. 2 arrangement suffers from the drawback that the PIN must now pass out of the keyboard unit and into the host computer where it is much more vunerable to being copied or substituted for. By accepting the overhead of encrypting the PIN code, the PIN may be protected during transmission over the links 14 and 18; however, if the PIN needs to undergo code translation in the host to make it understandable to the smartcard, then it will need to be processed in clear in the host computer, leaving it open to attack.

Another possible arrangement would be to have the ICC interface monitor all output from the keyboard controller in much the same manner as described in European patent specification EP-A-0 486 363 (Thomson CSF). In this case, the ICC controller would watch for a particular keyed input code telling it that the following key codes were to be treated as input for the smartcard. Such an arrangement permits a PIN code to be intercepted and passed directly to the smartcard; however, it suffers from the drawback of requiring the user to input first a special code to tell the ICC controller to intercept the PIN code.

It is an object of the present invention to provide a computer keyboard unit including an ICC interface, which alleviates at least some of the problems exhibited by the prior art discussed above.

SUMMARY OF THE INVENTION

According to the present invention, there is provided a computer keyboard unit for connection to a host computer, the keyboard unit comprising:

a key matrix including a set of alphanumeric keys, a keyboard controller for detecting a key press of the key matrix and for generating a corresponding key code, host interface means for interfacing the keyboard unit with the host computer, an ICC interface for receiving an integrated circuit card and exchanging data therewith, the ICC interface being connected to host interface means whereby to enable the host computer to exchange data with a card received in the ICC interface, and means for providing a mode-change command to the keyboard controller, the keyboard controller having both a normal mode of operation in which it passes the said key codes generated thereby to the host interface means for output to the host computer and a further mode of operation in which it passes the key codes to the ICC interface for transmission to a card received in the ICC interface, the keyboard controller changing from its normal mode of operation to its said further mode in response to the provision thereto of a mode-change command.

Advantageously, the keyboard controller is set in its said further mode of operation in order to enable a user to enter a PIN code for verification by a card currently inserted in the ICC interface. With this arrangement, the PIN code is passed directly to the card and not via the host computer, thereby eliminating the possibility of the PIN code being copied and/or substitued for in passage through the host computer.

The means for providing the mode-change command will generally comprise means for receiving the mode-change command from the host computer via the host interface means. Where the host interface means comprises a separate host link interface for the key codes and for data exchange with the ICC interface, the mode-change command may be passed from the host to the keyboard unit using a predetermined one of the two link interfaces.

The said means for providing a mode-change command may alternatively comprise the ICC interface, the ICC interface being operative to generate the mode-change command in response to receiving a request for user data input from a card.

Generally, the ICC interface will include program-controlled processor means for controlling interfacing with a said card received by the ICC interface, and the keyboard controller will comprise program-controlled processor means for controlling key press detection and key code generation. In this case, the processor means of the keyboard controller and ICC interface are preferably jointly constituted by a single microcontroller.

Because the keyboard unit may be required to operate with a variety of different character/key assignments according to the preferred language option of the user, it may be necessary to provide translation means in the keyboard unit to translate each key press passed by the keyboard controller directly to the ICC interface, into the character/character code mapping understood by the card, the translation means effecting its translation taking into account the current character/key assignment of the keyboard.

An alternative way of ensuring that the correct code is passed to the card is to restrict the keys usable to pass user input directly to the card, to those keys that have the same mapping of character key to key code in virtually all languages—in particular, the keys of the numeric pad provided on most keyboards. For each of these keys, the key code will generally correspond to the code recognised by the card for the character concerned. A restriction to numeric pad keys will normally not be a problem where the user input data to be passed directly to the card is PIN code data.

BRIEF DESCRIPTION OF THE DRAWINGS

A computer keyboard unit embodying the invention will now be described, by way of non-limiting example, with reference to the accompanying diagrammatic drawings, in which.

BEST MODE OF CARRYING OUT THE INVENTION

Figure 3:
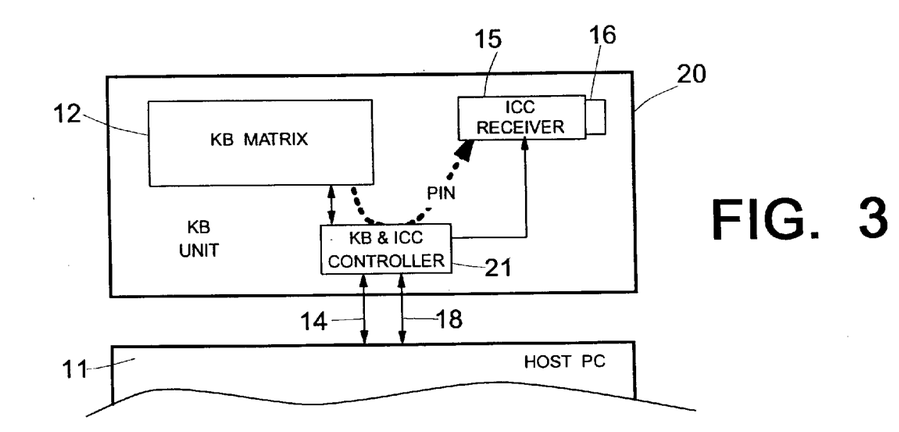
FIG. 3 is a diagram of the keyboard unit embodying the invention, the unit including an ICC interface.

FIG. 3 shows the general form of the computer keyboard unit 20 embodying the invention. The unit 20 comprises a standard key matrix 12, a microcontroller 21 that provides the functionality of a standard keyboard controller, and a keyboard/host link 14 communicating the keyboard unit 20 with a host computer (here, a PC). The microcontroller 21 provides for a normal mode of operation of the keyboard-controller functionality in which a key press results in the output of a corresponding key code to the host PC 11.

The keyboard unit 20 also comprises an ICC interface in the form of an ICC receiver 15 into which a smartcard 16 can be inserted, ICC controller functionality implemented by the microcontroller 21, and a serial link 18 for exchanging data with the host PC.

As well as the normal mode of operation of the keyboard controller functionality, the microcontroller 21 can be commanded to provide a special mode of operation of the keyboard controller functionality in which the key codes generated as a result of the next following four (for example) key presses are passed to the ICC functionality for onward transmission via the ICC receiver 15 to the smartcart 16. This special mode is entered whenever a PIN code is required to be passed to the card. The entry into this special mode is controlled by a command sent over the serial link 18 from the host PC to the microcontroller 21. With this arrangement, the PIN code is routed to the smartcard entirely within the keyboard unit 20. By making the keyboard unit 20 of tamper evident construction, the security of the PIN is very high.

Figure 4:
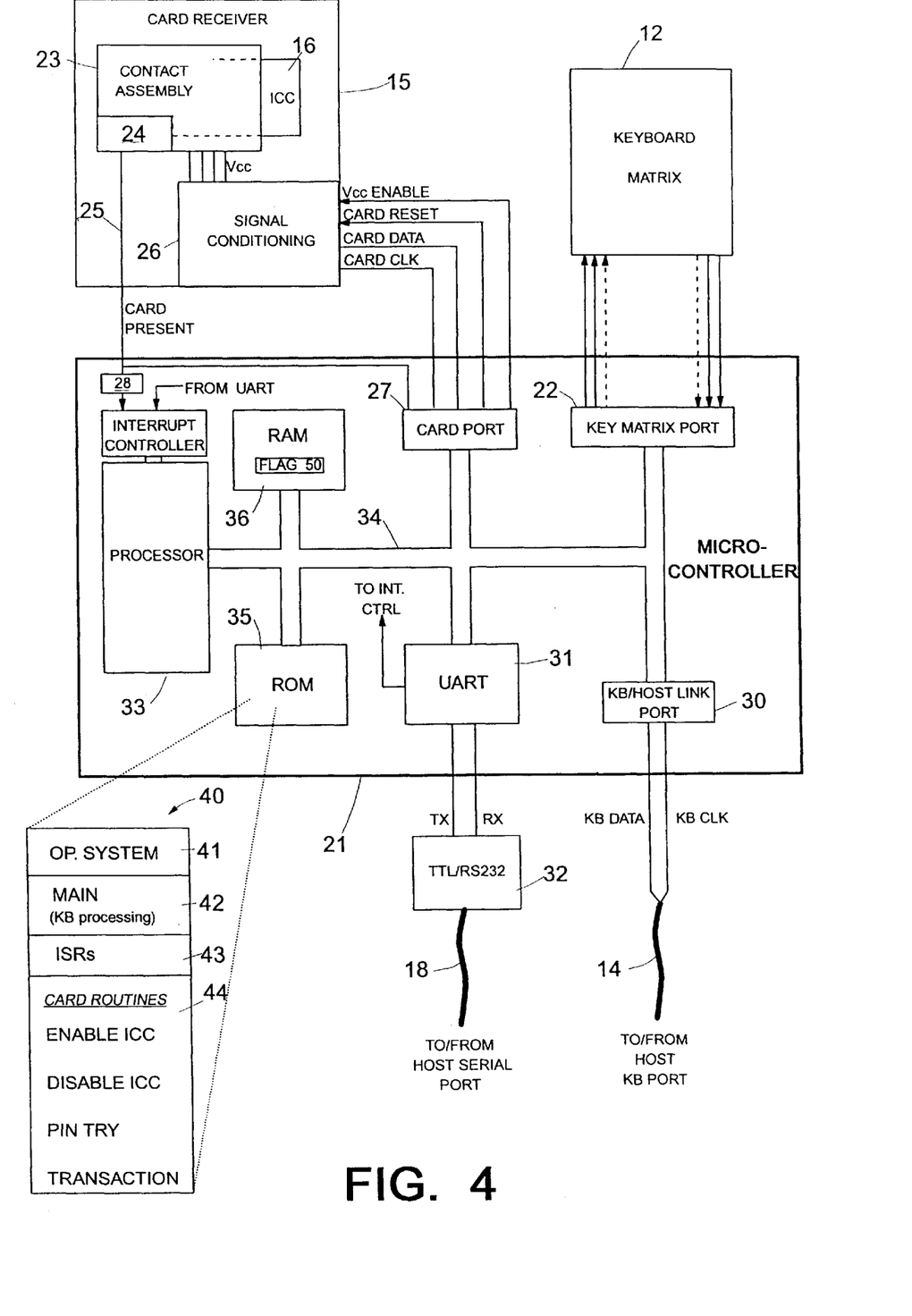
FIG. 4 is a functional block diagram of the FIG. 3 keyboard unit.

A more detailed description of the structure and operation of the FIG. 3 keyboard unit will now be given with reference to FIG. 4.

The keyboard matrix 12 comprises, for example, one hundred and one keys in the layout used for the IBM XT, AT and PS/2 personal computers, this layout including a separate numeric pad. A plurality of lines interconnect the keyboard matrix 12 with a key matrix port 22 of the microcontroller, enabling the latter to effect keyboard scanning in standard manner to detect a key press.

The card receiver 15 comprises a contact assembly 23 for receiving the smartcard 16 and making electrical contact with the card circuits. This contact assembly 23 also includes a switch 24 which, when a card is present in a fully inserted position in the contact assembly, causes a "card-present" signal on line 25 to reside in a "true" state; when no card is present, the card-present signal is in a "not-true" state. The card-present signal is fed to a circuit 28 of the microcontroller that causes the generation of an interrupt upon the card-present signal changes state from "true" to "not true", that is, upon a card starting to be withdrawn. The card receiver 15 also includes signal conditioning circuitry 26 that provides an electrical interface between the microcontroller 21 and the card 16. Four signal lines interconnect the signal conditioning circuitry 26 and a port 27 of the microcontroller 21, these being a card data line and card clock line for enabling half duplex communication between the card and microcontroller, a card reset line, and a Vcc enable line. This latter line is used to control the application of power (line voltage Vcc) to the card, power only being applied after the card has been fully inserted into the card receiver 15. The card-present signal fed to the microcontroller on line 25 is also supplied to the port 27.

Two keyboard/host links 14, 18 are provided between the microcontroller 21 and the host PC. The link 14 is a serial link connecting to a port 30 of the microcontroller and using, for example, the PS2 data exchange protocol for the passing of key codes and similar data between keyboard and host. The link 18 is also a serial link, for example a full duplex RS232 link, connecting a serial port of the host PC with a UART device 31 provided internally in the microcontroller 21. A level translation circuit 32 converts the RS232 signals on link 18 to and from TTL levels compatible with the microcontroller 21.

The microcontroller 21 comprises a processor block 33 that communicates via a bus structure 34 (including data, address and control lines) with a ROM memory block 35, a RAM memory block 36, and the external interfaces provided by the key matrix port 22, the card port 27, the KB/Host link port 30 and the UART 31. It will be appreciated that the arrangement of the microcontroller ports has been shown according to their logical arrangement for the present keyboard unit rather than in accordance with the actual port structure of a particular microcontroller (for example, in practice the card port 27 and link port 30 may be implemented through the same physical port of the microcontroller).

The microcontroller 21 also has an interrupt controller block 37 to which two interrupts are fed, one being that provided by circuit 28 whenever a card 16 is withdrawn from the card receiver 15, and the other being an internal interrupt generated by the UART 31 whenever incoming data is received over link 18.

The microcontroller 21 is controlled by programs 40 stored in the ROM memory block 35. These programs include a basic operating system 41 and a main program 42 which together provide the normal functionality expected of a keyboard controller. In particular, the main program 41 periodically scans the keyboard matrix 12 to see if a key has been pressed, and checks the port 30 for data input from the host PC. If a key press is detected, the main program calls a routine to generate the appropriate key code and output this code to the host PC over the link 14. If incoming data on link 14 is detected, a service routine is called to collect the data and execute any function required by it, if appropriate. As this mode operation of the keyboard controller functionality provided by the microcontroller 21 is standard in form, it will not be further described.

In addition to the operating system 41 and main program 42, the ROM memory block 35 stores interrupt service routines (ISRs) 43 for servicing the card removal interrupt and the UART interrupt, and a set of card routines 44 for providing ICC controller functionality. These routines 44 include:

- an ENABLE ICC routine for initialising operation of the smartcard in accordance, for example, with ISO standard 7816-3; this routine will only be fully executed if there is a smartcard present and the host wishes to communicate with it.
- a DISABLE ICC routine for terminating a session with the smartcard and removing power from it.
- a TRANSACTION routine for handline a single transaction of passing a message received from the host PC via link 18 to the smartcard via port 27, and then receiving back any response from the smartcard and passing this response to the host PC over link 18; this routine makes use of supporting subroutines for controlling the UART31 and card port 27 to effect the required message passing.
- a PIN TRY routine which is a specialised transaction routine that takes data not from the host PC but from the keyboard matrix 12 and passes it to the smartcard, the response of the smartcard being then fedback to the host PC over link 18; this routine thus provides for a modified mode of operation of the normal keyboard input functionality.

The overall operation of the keyboard unit 20 in relation to interfacing with a smartcard will now be outlined.

Figure 5:
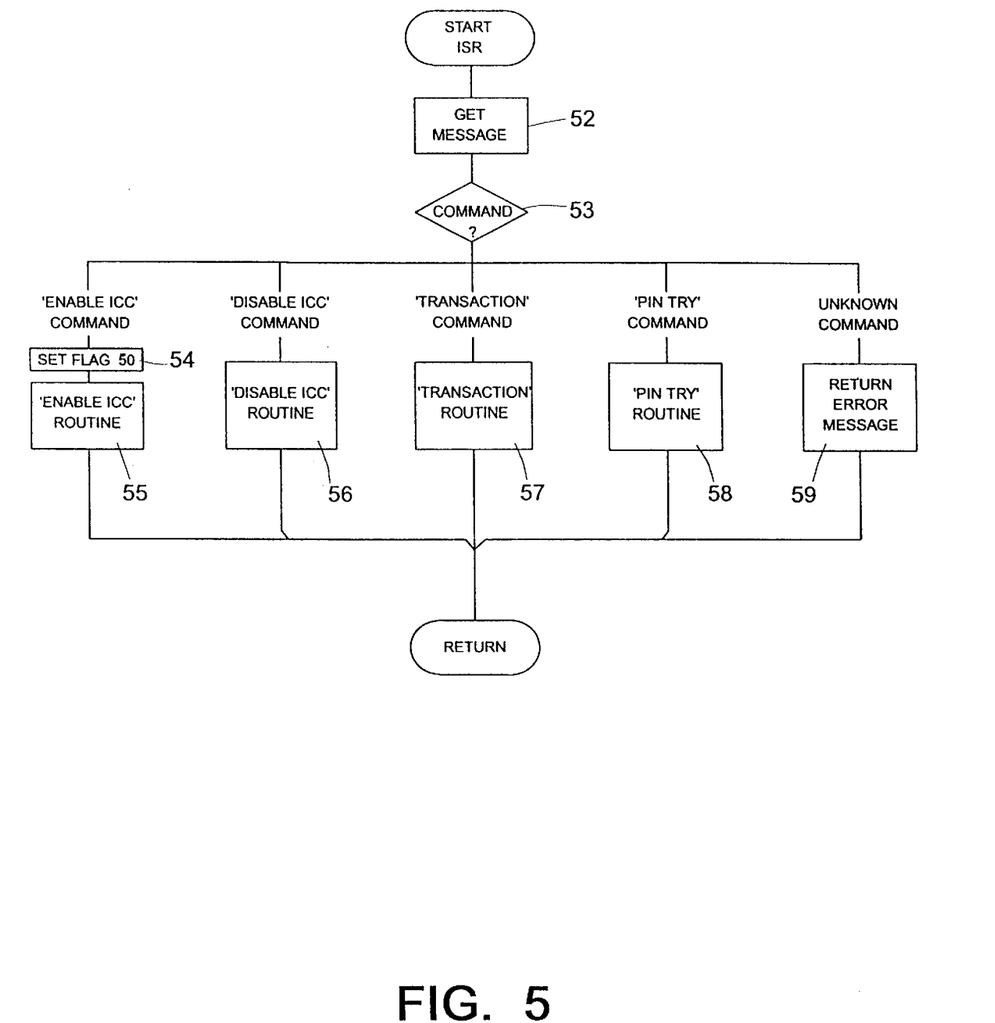
FIG. 5 is a flow diagram of a command-interpreter interrupt routine run by the FIG. 4 keyboard unit on receipt of a command from a connected host computer.

The interaction between the host PC and a smartcard inserted in the card receiver 15 is primarily controlled by the host PC sending command messages to the microcontroller 21 to execute a particular one of the card routines 44. Whenever a command message is received by the UART 31 an interrupt is generated and the processor 33 switches from the main program providing normal keyboard operation, to the UART interrupt service routine. This service routine is illustrated in FIG. 5 and involves an initial step 52 of assembling the incoming message followed by a step 53 of identifying the command received. It will be appreciated that some messages may include both a command and associated data.

In FIG. 5, only four commands are shown as acceptable ('Enable ICC', 'Disable ICC', 'Transaction', and 'PIN Try') and upon recognition of one of these commands the corresponding card routine is executed (steps 55, 56, 57 and 58). If none of these commands is recognised an error message is returned (step 59). Generally, a richer command set will be provided but for simplicity and clarity of explanation, only the foregoing four commands will be considered here.

After the card routine corresponding to the receiver command has been executed, the microcontroller returns to running the main program to effect normal keyboard operation.

Considering now how a smartcard session proceeds, it is the host PC that seeks to initiate a session by sending an Enable ICC command. This command results in the running of the ENABLE ICC routine which first checks the line 25 via the port 27 to see if a card is present in the card receiver. If no card is present, the ENABLE ICC routine sends an appropriate response to the host PC before terminating. However, if a card is present, then the ENABLE ICC routine proceeds with overseeing powering up of the smartcard and the establishment of communication with the card through port 27. The ENABLE ICC routine also sets a flag 50 to indicate that a smartcard session is in progress. Once these initial operations are complete, this is signalled to the host PC by a message passed over the serial link 18; thereafter, the ENABLE ICC routine is terminated and keyboard scanning recommenced pending a further card-related command from the host (or card withdrawal).

In the present embodiment, it is assumed that the host PC and smartcard interact by a series of transactions initiated by the host PC, each transaction involving a message from the PC to the card followed by a response from the card to the PC. The start of each transaction is signalled to the keyboard unit by a message over link 18 including a Transaction command. This command is recognised by the ISR started by the UART interrupt and results in the running of the TRANSACTION routine to handle the processing involved for a single transaction. Once the current transaction is finished, the TRANSACTION routine is terminated and keyboard scanning recommenced until another card-related command (for example, another TRANSACTION command) is received or the card withdrawn.

If from the response received from the card during a transaction, the host PC determines that the next input to the card should be the PIN code, then rather than initiating a normal transaction, the host PC will send the PIN Try command to the keyboard unit in order to run the PIN TRY routine. As already indicated, this routine, which will be further described below, oversees the passing of keyboard input by a user, directly to the card and the return of the card response (for example: 'OK, 'Failed, try again', 'Third failure, no further try accepted') to the host PC. If the host PC receives a 'Failed, try again' response, it will reissue the PIN Try command; otherwise, another action appropriate to the circumstances will be taken.

When a card session has been completed, the host PC issues the Disable ICC command to run the DISABLE ICC routine. This routine removes power from the smartcard and resets the flag 50; the routine may also carry out other housekeeping tasks.

Upon removal of a smartcard from the card receiver, the ISR run as a result of the interrupt generated by circuit 28, will first check the flag 50 to see if a smartcard session is still in progress; if this is the case, the ISR immediately removes power from the card and sends a message to the host PC telling it what has happened. The flag 50 is also be reset.

Having described a card session, a more detailed description will now be given of the PIN TRY routine (see FIG. 6). As already mentioned, this routine is called in response to a PIN Try command from the host PC and its purpose is to cause keyboard input to be directed by the microcontroller 21 to the card 16 via the card port 27 and card receiver 15, rather than being output over link 14 to the host PC. In the present case, the PIN TRY routine is arranged to pass to the card four numeric characters input via the keyboard numeric pad; generally, the pressing of keys outside of the numeric pad results in no action except a notification to the host PC.

Figure 6:
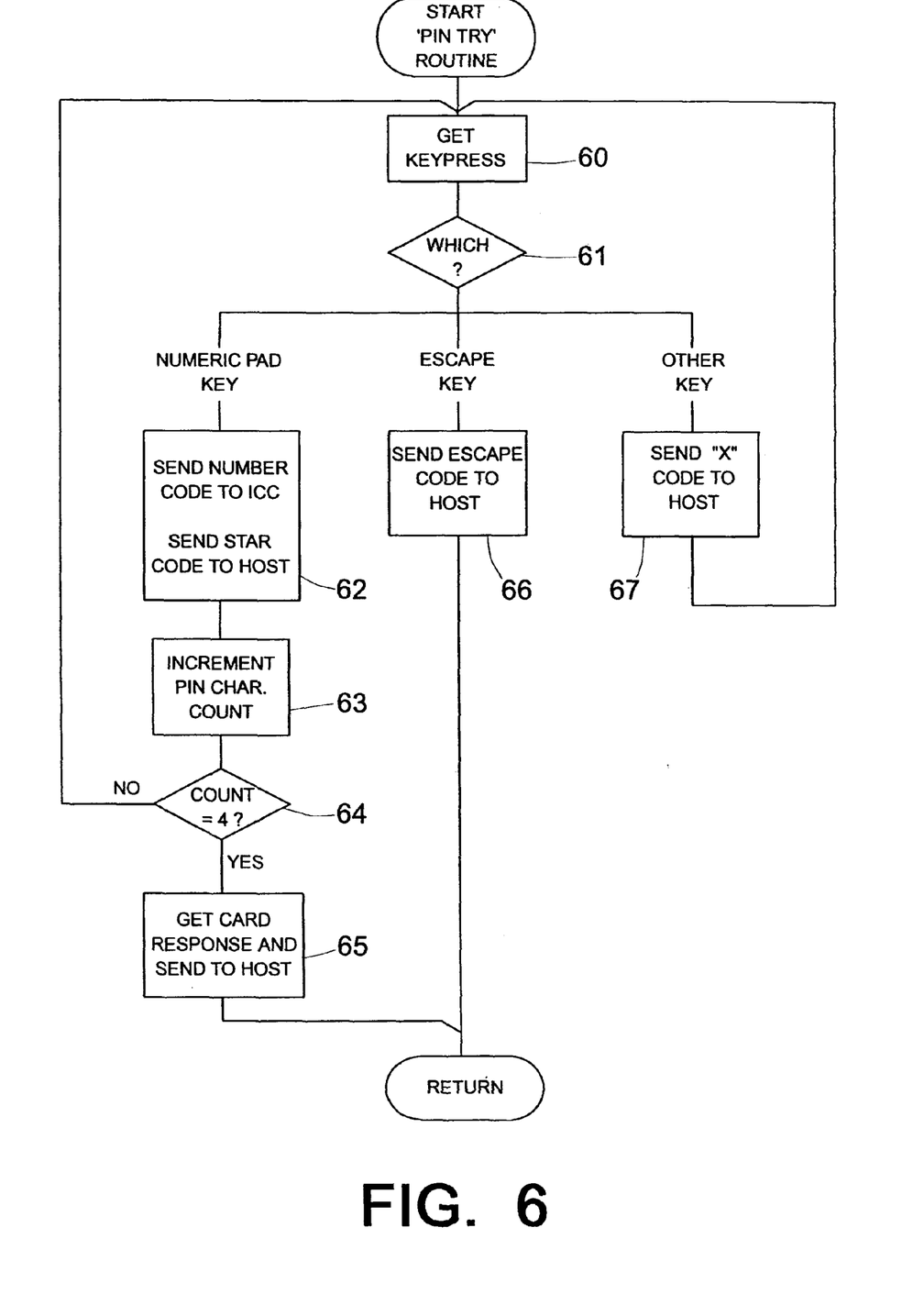
FIG. 6 is a flow diagram of a PIN TRY routine run by the FIG. 4 keyboard unit to pass a user-input PIN to a smartcard inserted in the ICC interface of the keyboard unit.

Turning to the FIG. 6 flow chart, the first step 60 involves detecting and identifying a keypress for which purpose subroutines used by the main program 41 are conveniently employed. Step 61 checks the identity of the key pressed. If it is a numeric pad key ('0' to '9') the corresponding key code is sent via the card port 27 to the smartcard (step 62) and a 'star' character is sent back to the host PC (over either link) for display; thereafter, a PIN character count (initially zero) is incremented (step 63) and then tested (step 64) to see if four number codes have been sent to the card. If less than four codes have been sent, the routine returns to step 60; however, if four number codes have been sent (in the present example, a full PIN code sequence), the card response is obtained through port 27 and sent to the host over the serial link 18 after which the routine is terminated.

If in step 61 a non numeric pad key is detected, then unless the key concerned is the Escape key, an "X" character is sent to the host PC to signal a wrong keypress (step 67) but no other action is taken and processing returns to step 60. When the host PC receives the 'X' character, it may display an appropriate message reminding the user only to use the numeric pad keys.

If the user presses the Escape Key, then this is taken as indicating that the user wishes to abandon PIN entry. Accordingly, in step 66 the Escape key code is sent back to the host for it to take appropriate further action (including informing the card); thereafter, the PIN TRY routine is terminated.

It will be appreciated that the PIN TRY routine effectively provides a modified form of operation for the keyboard functionality of the microcontroller as well as conceptually forming a card routine.

By means of the PIN TRY routine, the present keyboard unit permits a user to input a PIN directly to the smartcard without this PIN passing out of the unit. The security of the PIN is thus improved.

Many variants to the above described keyboard unit are, of course, possible. For example, although the direct transfer of codes from the keyboard to the card has only been described in relation to PIN codes, such transfer could also be effected for other user input via the keyboard.

Furthermore, the length of such input restricted to four valid characters in the above example, could be made any desired length and, indeed, could be user determined with the user pressing a particular key (such as the Enter key) to indicate the end of input and the return to normal keyboard operation; return to normal keyboard operation could also be determined by the host sending an appropriate mode change command. Again, whilst in the above example it is the host PC which instructs entry into the special keyboard mode in which keyboard input is passed directly to the card, it would also be possible to have the ICC interface functionality instruct such a mode change upon recognition of an appropriate card state (for example, the need for PIN input).

Although the keyboard functionality and the ICC functionality are preferably both provided by the same microcontroller, it would of course be possible to retain the use of separate microcontrollers as in the keyboard units of FIGS. 1 and 2.

With regard to the communication between the keyboard unit 20 and the host PC 11, although two links 14 and 18 are described in the above example, it would be possible to arrange for a single link to carry all necessary information. However, this would involve changes to the current standard protocols used for keyboard communication.

The foregoing description has assumed that the key codes output by the microcontroller will be understandable by the smartcard; in fact, this may not necessarily be the case. More particularly, with a standard keyboard, each key has a corresponding predetermined key code that will be passed to the host computer when the key is pressed. However, since the mapping of characters onto the keys of a keyboard varies from country to country, the character represented by a particular key code will also vary from country to country. Because the host computer generally internally works with one standard mapping of character to character code, if the effective mapping of characters to key codes effected by the keyboard does not correspond to the standard character/character code mapping used by the host computer, the latter must effect the necessary translation so that the final internal character code corresponds to the intended character input according to the host mapping regardless of which key represented the character on the keyboard.

Furthermore, if the host computer needs to communicate with an integrated circuit card, a further code translation may be necessary as the card could operate according to a different character/character code mapping; this will generally not be the case as most cards will use the character/characer code mapping as is standardly used by comuters. Nevertheless, should a further translation be needed, this would usually be carrried out by the host computer.

In the case of the present keyboard unit, however, when the keyed input is passed directly to the card, any needed code translation between the character/character-code mappings normally used by the keyboard and card can no longer be performed by the host computer. Accordingly, in one variant embodiment, the keyboard unit is provided with code translation means for ensuring that the code passed by the ICC interface to the card following a key press during said further mode of operation of the keyboard controller, correctly represents the user input character according to the character/character code mapping used by the integrated circuit card. This translation can either be effected after the generation of initial key codes in standard manner or directly from the scan codes.

Where translation is effected after the generaton of key codes, then it is conceptually debatable whether keycode tanslation forms part of the keyboard controller functionality or ICC functionality and, in reality, this distinction is not particularly meaningful for embodiments where a single microcontroller implements both functionalities. When separate microcontrollers are used for the keyboard and ICC functionalities, then code translation function could be placed in either.

In any event, it will be necessary for the code translation means to be informed about the translation required and this will require it to be told information about the current character/character code mappings used by the keyboard and by the card; such information may, for example, be provided by the host computer.

An alternative way of ensuring that the correct code is passed to the card is to restrict the keys usable to pass user input directly to the card, to those keys that have the same mapping of character key to key code in virtually all languages—in particular, the keys of the numeric pad provided on most keyboards. For each of these keys, the key code will generally correspond to the code recognised by the card for the character concerned. A restriction to numeric pad keys will normally not be a problem where the user input data to be passed directly to the card is PIN code data.

It should be noted that although the key matrix has been described as being a one-hundred-and-one key arrangement such as is typically used for an alphanumeric character set made up of Roman alphabet and Arabic numbers, the key matrix may be one intended for use with any alphanumeric character set including ideogrammatic ones as used in the Chinese and Japanese languages and the term "set of alphanumeric keys" as used herein should be accordingly understood in this broad sense.

What is claimed is:

1. A computer keyboard unit for connection to a host computer, said keyboard unit comprising:

a key matrix including a set of alphanumeric keys, a keyboard controller for detecting a key press of the key matrix and for generating a corresponding key code, host interface means for interfacing the keyboard unit with said host computer, an ICC interface for receiving an integrated circuit card and exchanging data therewith, said ICC interface being connected to host interface means whereby to enable the host computer to exchange data with a said card received in the ICC interface, and means for providing a mode-change command to the keyboard controller, the keyboard controller having both a normal mode of operation in which it passes the said key codes generated thereby to said host interface means for output to the host computer and a further mode of operation in which it passes said key codes to the ICC interface for transmission to a said card received in said ICC interface, the keyboard controller changing from said normal mode to said further mode in response to the provision thereto of a said mode-change command, the keyboard controller being set into its said further mode of operation for the input of a PIN code into a said card received in the ICC interface.

2. A computer keyboard unit according to claim 1, wherein said means for providing a mode-change command comprises means for receiving said mode-change command from said host computer via said host interface means.

3. A computer keyboard unit according to claim 2, wherein said host interface means comprises a single two-way link interface.

4. A computer keyboard unit according to claim 2, wherein said host interface means comprises two link interfaces, one said link interface serving to pass said key codes to the host computer during said normal mode of operation of the computer and the other said link interface serving for the exchange of data between said card and said host computer, a predetermined one of the two said link interfaces serving for the receipt of said mode-change command from the host computer.

5. A computer keyboard unit according to claim 1, wherein said means for providing a mode-change command comprises said ICC interface, said ICC interface including means for generating said mode-change command in response to receiving a request for user data input from a said card.

6. A computer keyboard unit according to claim 1, wherein ICC interface includes program-controlled processor means for controlling interfacing with a said card received by the ICC interface, and said keyboard controller comprises program-controlled processor means for controlling key press detection and key code generation.

7. A computer keyboard unit according to claim 6, wherein the said processor means of said keyboard controller and ICC interface are jointly constituted by a single microcontroller.

8. A computer keyboard unit according to claim 1, wherein said key matrix includes a numeric key pad; said keyboard controller, when in its said further mode of operation, passing to said ICC interface only those said key codes corresponding to key presses associated with said numeric key pad.

9. A computer keyboard unit according to claim 1, further comprising code translation means for ensuring that the code passed by the ICC interface to the card following a key press during said further mode of operation of the keyboard controller, correctly represents the user input character according to the character/character code mapping used by the integrated circuit card.

10. A computer keyboard unit according to claim 1, wherein said unit is of tamper evident construction.

11. A computer keyboard unit for connection to a host computer, said keyboard unit comprising:

a key matrix including a set of alphanumeric keys, a keyboard controller comprising program-controlled processor means for detecting a key press of the key matrix and for generating a corresponding key code, host interface means for interfacing the keyboard unit with said host computer, an ICC interface for receiving an integrated circuit card and exchanging data therewith, said ICC interface including program-controlled processor means for controlling interfacing with a said card, and said ICC interface being connected to host interface means whereby to enable the host computer to exchange data with a said card received in the ICC interface, and means for providing a mode-change command to the keyboard controller, said processor by means of said keyboard controller and ICC interface having both a normal mode of operation in which it passes the said key codes generated thereby to said host interface means for output to the host computer and a further mode of operation in which it passes said key codes to the ICC interface for transmission to a said card received in said ICC interface, the keyboard controller changing from said normal mode to said further mode in response to the provision thereto of a said mode-change command, wherein the keyboard controller is set into its said further mode of operation for the input of a PIN code into a said card received in the ICC interface.

12. A computer keyboard unit according to claim 11, wherein said unit is of tamper evident construction.

13. A computer keyboard unit for connection to a host computer, said keyboard unit comprising:

a key matrix including a set of alphanumeric keys, a keyboard controller for detecting a key press of the key matrix and for generating a corresponding key code, host interface means for interfacing the keyboard unit with said host computer, an ICC interface for receiving an integrated circuit card and exchanging data therewith, said ICC interface being connected to host interface means whereby to enable the host computer to exchange data with a said card received in the ICC interface, and means for providing a mode-change command to the keyboard controller, the keyboard controller having both a normal mode of operation in which it passes the said key codes generated thereby to said host interface means for output to the host computer and a further mode of operation in which it passes said key codes to the ICC interface for transmission to a said card received in said ICC interface, the keyboard controller changing from said normal mode to said further mode in response to the provision thereto of a said mode-change command, wherein said means for providing a mode-change command comprises said ICC interface, said ICC interface including means for generating said mode-change command in response to receiving a request for user data input from a said card.

14. A computer keyboard unit according to claim 13, wherein said host interface means comprises a single two-way link interface.

15. A computer keyboard unit according to claim 13, wherein ICC interface includes program-controlled processor means for controlling interfacing with a said card received by the ICC interface, and said keyboard controller comprises program-controlled processor means for controlling key press detection and key code generation.

16. A computer keyboard unit according to claim 15, wherein the said processor means of said keyboard controller and ICC interface are jointly constituted by a single microcontroller.

17. A computer keyboard unit according to claim 13, wherein said key matrix includes a numeric key pad; said keyboard controller, when in its said further mode of operation, passing to said ICC interface only those said key codes corresponding to key presses associated with said numeric key pad.

18. A computer keyboard unit according to claim 17, further comprising code translation means for ensuring that the code passed by the ICC interface to the card following a key press during said further mode of operation of the keyboard controller, correctly represents the user input character according to the character/character code mapping used by the integrated circuit card.

19. A computer keyboard unit according to claim 13, wherein said unit is of tamper evident construction.

20. A computer keyboard unit for connection to a host computer, said keyboard unit comprising:

a key matrix including a set of alphanumeric keys, a keyboard controller for detecting a key press of the key matrix and for generating a corresponding key code, host interface means for interfacing the keyboard unit with said host computer, an ICC interface for receiving an integrated circuit card and exchanging data therewith, said ICC interface being connected to host interface means whereby to enable the host computer to exchange data with a said card received in the ICC interface, and means for providing a mode-change command to the keyboard controller, the keyboard controller having both a normal mode of operation in which it passes the said key codes generated thereby to said host interface means for output to the host computer and a further mode of operation in which it passes said key codes to the ICC interface for transmission to a said card received in said ICC interface, the keyboard controller changing from said normal mode to said further mode in response to the provision thereto of a said mode-change command, said keyboard controller further comprising code translation means for ensuring that the code passed by the ICC interface to the card following a key press during said further mode of operation of the keyboard controller, correctly represents the user input character according to the character/character code mapping used by the integrated circuit card.

21. A computer keyboard unit according to claim 20, wherein said means for providing a mode-change command comprises means for receiving said mode-change command from said host computer via said host interface means.

22. A computer keyboard unit according to claim 20, wherein said host interface means for comprises a single two-way link interface.

23. A computer keyboard unit according to claim 20, wherein said host interface means comprises two link interfaces, one said link interface serving to pass said key codes to the host computer during said normal mode of operation of the computer and the other said link interface serving for the exchange of data between said card and said host computer, a predetermined one of the two said link interfaces serving for the receipt of said mode-change command from the host computer.

24. A computer keyboard unit according to claim 20, wherein ICC interface includes program-controlled processor means for controlling interfacing with a said card received by the ICC interface, and said keyboard controller comprises program-controlled processor means for controlling key press detection and key code generation.

25. A computer keyboard unit according to claim 20, wherein the said processor means of said keyboard controller and ICC interface are jointly constituted by a single microcontroller.

26. A computer keyboard unit according to claim 20, wherein said key matrix includes a numeric key pad; said keyboard controller, when its in said further mode of operation, passing to said ICC interface only those said key codes corresponding to key presses associated with said numeric key key pad.

27. A computer keyboard unit according to claim 20, wherein said unit is of tamper evident construction.

* * * * *